United States Patent
Sprague et al.

(10) Patent No.: US 10,111,037 B1
(45) Date of Patent: *Oct. 23, 2018

(54) SYSTEM AND METHOD FOR COLLOCATION DETECTION

(71) Applicant: PALANTIR TECHNOLOGIES INC., Palo Alto, CA (US)

(72) Inventors: Matthew Sprague, Santa Monica, CA (US); Miklos Danka, London (GB); Bill Dwyer, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,635

(22) Filed: Nov. 21, 2016

Related U.S. Application Data

(63) Continuation of application No. 14/088,251, filed on Nov. 22, 2013, now Pat. No. 9,503,844.

(51) Int. Cl.
  *H04W 4/02* (2018.01)
  *H04L 29/08* (2006.01)
  *H04W 88/08* (2009.01)

(52) U.S. Cl.
  CPC ............. *H04W 4/023* (2013.01); *H04L 67/22* (2013.01); *H04W 88/08* (2013.01)

(58) Field of Classification Search
  CPC ....... H04W 64/00; H04W 4/02; H04W 12/02; H04W 4/021; H04W 4/023; H04W 4/028;
  (Continued)

(56) References Cited

U.S. PATENT DOCUMENTS

| 5,021,792 A | 6/1991 | Hwang |
| 5,555,503 A | 9/1996 | Kyrtsos et al. |

(Continued)

FOREIGN PATENT DOCUMENTS

| EP | 2400448 | 12/2011 |
| EP | 2816513 | 12/2014 |

(Continued)

OTHER PUBLICATIONS

IBM, "Determining Business Object Structure," IBM, 2004, 9 pages.

(Continued)

*Primary Examiner* — Thai Vu
(74) *Attorney, Agent, or Firm* — Knobbe, Martens, Olson and Bear, LLP

(57) ABSTRACT

Systems and methods are disclosed for collocation detection. In accordance with one implementation, a method is provided for collocation detection. The method includes obtaining a first object observation that includes a first object identifier, a first observation time, and a first observation location. The method also includes obtaining a second object observation that includes a second object identifier, a second observation time, and a second observation location. In addition, the method includes associating the first observation with a first area on a map, associating the second observation with a second area on the map, and determining whether a potential meeting occurred between objects associated with the first object identifier and the second object identifier based on the first and second observation times, and the first and second areas.

20 Claims, 5 Drawing Sheets

(58) Field of Classification Search
CPC ..... H04W 4/025; H04W 4/029; H04W 88/08; H04L 67/22; H04L 63/1425; H04L 63/30; G08B 13/19608; G08B 13/19613; G08B 13/19645
USPC ......... 455/404.1, 404.2, 414.2, 456.1–456.6, 455/457
See application file for complete search history.

(56) References Cited

U.S. PATENT DOCUMENTS

| | | | |
|---|---|---|---|
| 5,670,987 | A | 9/1997 | Doi et al. |
| 6,141,659 | A | 10/2000 | Barker et al. |
| 6,189,003 | B1 | 2/2001 | Leal |
| 6,272,489 | B1 | 8/2001 | Rauch et al. |
| 6,642,945 | B1 | 11/2003 | Sharpe |
| 7,188,100 | B2 | 3/2007 | De Bellis et al. |
| 7,383,053 | B2 | 6/2008 | Kent et al. |
| 7,523,100 | B1 | 4/2009 | Bionda et al. |
| 7,529,734 | B2 | 5/2009 | Dirisala |
| 7,652,622 | B2 | 1/2010 | Hansen et al. |
| 7,706,817 | B2 | 4/2010 | Bamrah et al. |
| 7,725,547 | B2 | 5/2010 | Albertson et al. |
| 7,747,648 | B1 | 6/2010 | Kraft et al. |
| 7,945,470 | B1 | 5/2011 | Cohen et al. |
| 8,028,894 | B2 | 10/2011 | Lapstun et al. |
| 8,402,047 | B1 | 3/2013 | Mangini et al. |
| 8,521,135 | B2 | 8/2013 | Cryderman |
| 8,739,059 | B2 | 5/2014 | Rabenold et al. |
| 8,762,870 | B2 | 6/2014 | Robotham et al. |
| 8,849,254 | B2 | 9/2014 | Bolon |
| 9,037,407 | B2 | 5/2015 | Thompson |
| 9,123,086 | B1 | 9/2015 | Freeland et al. |
| 9,262,529 | B2 | 2/2016 | Colgrove et al. |
| 9,275,069 | B1 | 3/2016 | Garrod et al. |
| 9,301,103 | B1 | 3/2016 | Thompson |
| 9,313,233 | B2 | 4/2016 | Sprague et al. |
| 2003/0152277 | A1 | 8/2003 | Hall et al. |
| 2003/0227746 | A1 | 12/2003 | Sato |
| 2004/0203380 | A1 | 10/2004 | Hamdi et al. |
| 2005/0004759 | A1* | 1/2005 | Siegel ............... G01S 13/66 701/519 |
| 2005/0125436 | A1 | 6/2005 | Mudunuri et al. |
| 2005/0143096 | A1 | 6/2005 | Boesch |
| 2005/0210409 | A1 | 9/2005 | Jou |
| 2006/0116991 | A1 | 6/2006 | Calderwood |
| 2006/0206235 | A1 | 9/2006 | Shakes et al. |
| 2006/0250764 | A1 | 11/2006 | Howarth et al. |
| 2007/0043744 | A1 | 2/2007 | Carro |
| 2007/0118547 | A1 | 5/2007 | Gupta et al. |
| 2007/0130541 | A1 | 6/2007 | Louch et al. |
| 2007/0198571 | A1 | 8/2007 | Ferguson et al. |
| 2007/0250491 | A1 | 10/2007 | Olszak et al. |
| 2008/0007618 | A1 | 1/2008 | Yuasa |
| 2008/0227473 | A1 | 9/2008 | Haney |
| 2008/0252419 | A1 | 10/2008 | Batchelor et al. |
| 2009/0005070 | A1 | 1/2009 | Forstall et al. |
| 2009/0138790 | A1 | 5/2009 | Larcheveque et al. |
| 2009/0143052 | A1 | 6/2009 | Bates et al. |
| 2009/0156231 | A1* | 6/2009 | Versteeg ............... G01S 5/0252 455/456.1 |
| 2009/0265105 | A1 | 10/2009 | Davis et al. |
| 2009/0268030 | A1* | 10/2009 | Markham ............... G01S 3/54 348/158 |
| 2009/0315679 | A1 | 12/2009 | Bauchot et al. |
| 2010/0058212 | A1 | 3/2010 | Belitz et al. |
| 2010/0073315 | A1 | 3/2010 | Lee et al. |
| 2010/0082842 | A1 | 4/2010 | Lavrov et al. |
| 2010/0121817 | A1 | 5/2010 | Meyer et al. |
| 2010/0173619 | A1 | 7/2010 | Hua et al. |
| 2010/0185984 | A1* | 7/2010 | Wright ............... G06T 11/206 715/833 |
| 2010/0191884 | A1 | 7/2010 | Holenstein et al. |
| 2010/0214117 | A1* | 8/2010 | Hazzani ............... H04W 4/02 340/8.1 |
| 2010/0223543 | A1 | 9/2010 | Marston |
| 2010/0281458 | A1 | 11/2010 | Paladino et al. |
| 2010/0306713 | A1 | 12/2010 | Geisner et al. |
| 2011/0022312 | A1 | 1/2011 | McDonough et al. |
| 2011/0093440 | A1 | 4/2011 | Asakura et al. |
| 2011/0158469 | A1 | 6/2011 | Mastykarz |
| 2011/0202557 | A1 | 8/2011 | Atsmon et al. |
| 2011/0211563 | A1* | 9/2011 | Herrala ............... H04W 4/029 370/338 |
| 2011/0279323 | A1* | 11/2011 | Hung ............... G01S 19/14 342/451 |
| 2011/0310005 | A1 | 12/2011 | Chen et al. |
| 2012/0010812 | A1 | 1/2012 | Thompson |
| 2012/0015673 | A1 | 1/2012 | Klassen et al. |
| 2012/0032975 | A1 | 2/2012 | Koch |
| 2012/0036434 | A1 | 2/2012 | Oberstein |
| 2012/0150578 | A1 | 6/2012 | Mangat et al. |
| 2012/0166929 | A1 | 6/2012 | Henderson et al. |
| 2012/0216106 | A1 | 8/2012 | Casey |
| 2012/0268269 | A1* | 10/2012 | Doyle ............... G08B 21/0202 340/539.13 |
| 2013/0005362 | A1 | 1/2013 | Borghei |
| 2013/0013642 | A1 | 1/2013 | Klein et al. |
| 2013/0143597 | A1 | 6/2013 | Mitsuya et al. |
| 2013/0165069 | A1 | 6/2013 | Nitta et al. |
| 2013/0196614 | A1 | 8/2013 | Pahlevani |
| 2013/0235749 | A1 | 9/2013 | Cho et al. |
| 2013/0262171 | A1 | 10/2013 | Solodko et al. |
| 2013/0262497 | A1 | 10/2013 | Case et al. |
| 2013/0295970 | A1 | 11/2013 | Sheshadri et al. |
| 2014/0258827 | A1 | 9/2014 | Gormish et al. |
| 2014/0302783 | A1 | 10/2014 | Aiuto et al. |
| 2014/0357299 | A1* | 12/2014 | Xu ............... H04W 4/023 455/456.2 |
| 2015/0080012 | A1 | 3/2015 | Sprague et al. |
| 2015/0331919 | A1 | 11/2015 | Freeland et al. |
| 2016/0110458 | A1 | 4/2016 | Colgrove et al. |

FOREIGN PATENT DOCUMENTS

| | | |
|---|---|---|
| EP | 2916276 | 9/2015 |
| WO | WO 2004/038548 | 5/2004 |

OTHER PUBLICATIONS

Notice of Allowance for U.S. Appl. No. 13/181,392 dated Jan. 22, 2015.
Notice of Allowance for U.S. Appl. No. 13/838,815 dated Jun. 19, 2015.
Notice of Allowance for U.S. Appl. No. 13/838,815 dated Jan. 29, 2015.
Notice of Allowance for U.S. Appl. No. 13/839,026 dated Mar. 11, 2016.
Notice of Allowance for U.S. Appl. No. 14/334,232 dated Nov. 10, 2015.
Notice of Allowance for U.S. Appl. No. 14/487,342 dated Sep. 23, 2015.
Notice of Allowance for U.S. Appl. No. 14/690,905 dated Nov. 23, 2015.
Official Communication for European Patent Application No. 14159447.3 dated Nov. 25, 2014.
Official Communication for European Patent Application No. 14159447.3 dated Jan. 8, 2015.
Official Communication for European Patent Application No. 15157642.8 dated Jul. 20, 2015.
Official Communication for New Zealand Patent Application No. 622501 dated Apr. 1, 2014.
Official Communication for New Zealand Patent Application No. 622501 dated Jun. 5, 2014.
Official Communication for U.S. Appl. No. 13/181,392 dated Aug. 28, 2014.
Official Communication for U.S. Appl. No. 13/831,199 dated Jun. 3, 2015.
Official Communication for U.S. Appl. No. 13/831,199 dated Oct. 6, 2015.

(56) References Cited

OTHER PUBLICATIONS

Official Communication for U.S. Appl. No. 13/831,199 dated May 9, 2016.
Official Communication for U.S. Appl. No. 13/839,026 dated Aug. 4, 2015.
Official Communication for U.S. Appl. No. 14/027,118 dated May 12, 2015.
Official Communication for U.S. Appl. No. 14/027,118 dated Sep. 16, 2015.
Official Communication for U.S. Appl. No. 14/088,251 dated Aug. 26, 2015.
Official Communication for U.S. Appl. No. 14/088,251 dated Jun. 30, 2015.
Official Communication for U.S. Appl. No. 14/196,814 dated Jun. 13, 2016.
Official Communication for U.S. Appl. No. 14/196,814 dated May 5, 2015.
Official Communication for U.S. Appl. No. 14/196,814 dated Oct. 7, 2015.
Official Communication for U.S. Appl. No. 14/334,232 dated Jul. 10, 2015.
Official Communication for U.S. Appl. No. 14/487,342 dated Apr. 23, 2015.
Official Communication for U.S. Appl. No. 14/580,218 dated Jan. 7, 2016.
Official Communication for U.S Appl. No. 14/690,905 dated Oct. 7, 2015.
Official Communication for U.S. Appl. No. 15/047,405 dated Apr. 1, 2016.
Restriction Requirement for U.S. Appl. No. 13/839,026 dated Apr. 2, 2015.
Notice of Allowance for U.S. Appl. No. 14/027,118 dated Feb. 4, 2016.
Notice of Allowance for U.S. Appl. No. 14/088,251 dated Aug. 30, 2016.
Official Communication for U.S. Appl. No. 14/088,251 dated Feb. 12, 2015.
Official Communication for U.S. Appl. No. 14/088,251 dated Apr. 18, 2016.
Official Communication for U.S. Appl. No. 14/088,251 dated May 20, 2015.

* cited by examiner

SYSTEM AND METHOD FOR COLLOCATION DETECTION

REFERENCE TO RELATED APPLICATION

This application is a continuation of U.S. Non-Provisional application Ser. No. 14/088,251, filed on Nov. 22, 2013, the disclosure of which is expressly incorporated herein by reference in its entirety.

BACKGROUND

Intelligence and law enforcement agencies use various technologies to detect illegal or suspicious activity. The monitoring of electronic activity can assist these efforts. Given the vast amounts of collected electronic activity data, analyzing that data for potentially suspicious activities, such as meetings between suspect individuals, can be a time and resource consuming task.

BRIEF DESCRIPTION OF THE DRAWINGS

Reference will now be made to the accompanying drawings that illustrate exemplary embodiments of the present disclosure. In the drawings.

DESCRIPTION OF EXEMPLARY EMBODIMENTS

Reference will now be made in detail to several exemplary embodiments of the present disclosure, including those illustrated in the accompanying drawings. Whenever possible, the same reference numbers will be used throughout the drawings to refer to the same or like parts.

Embodiments of the present disclosure generally relate to systems and methods of collocation detection. Such embodiments include systems and methods that are adapted to detect two or more electronic devices that were present at the same location (e.g., within a predefined vicinity of each other) at the same time and for a predefined period of time. While several embodiments of the present disclosure are disclosed herein with reference to mobile electronic devices, such as mobile phones, smart phones, and satellite phones, it will be appreciated that embodiments of the present disclosure are not limited to such devices and may be adapted or applied to other types of electronic devices, such as tablets, Personal Digital Assistants (PDAs), laptops, wearable computing devices, and navigation systems, as well as any systems into which such electronic devices are integrated, or to which such electronic devices are attached.

Figure 1:
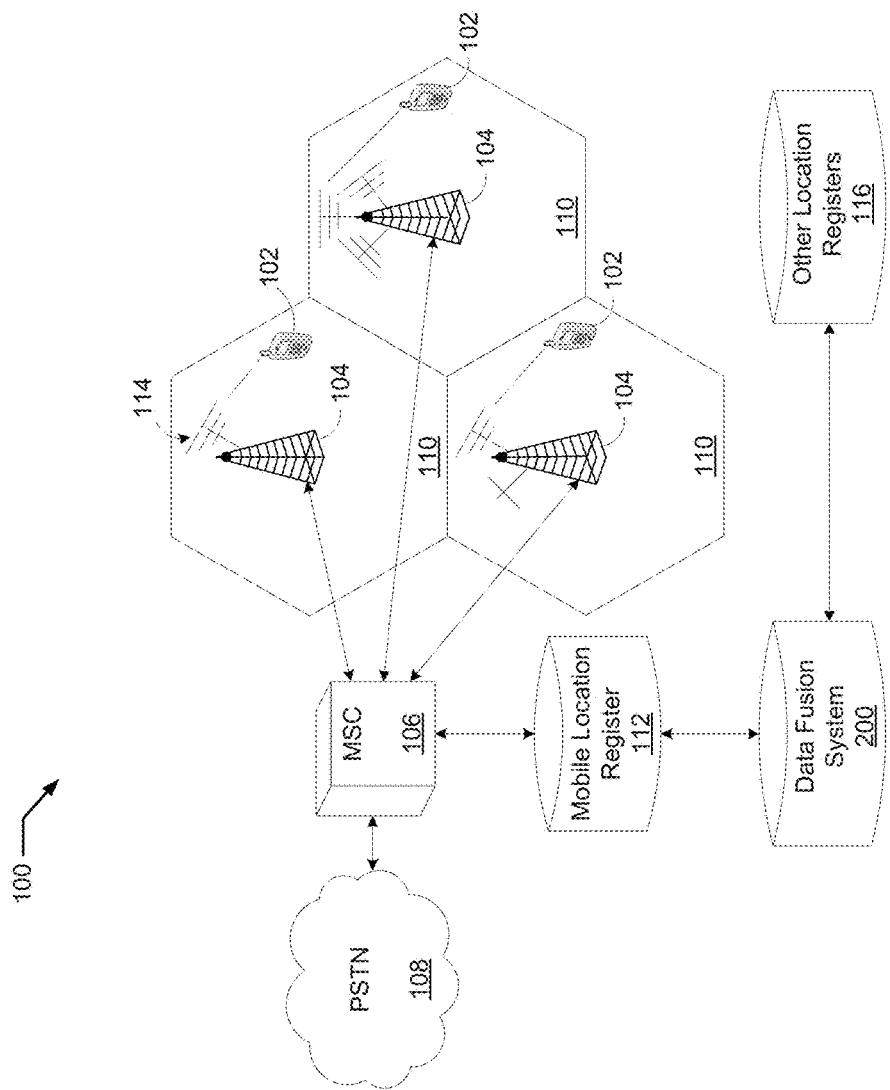
FIG. 1 is a block diagram of an exemplary mobile network environment, consistent with embodiments of the present disclosure.

Reference is first made to FIG. 1, which illustrates, in block diagram form, an exemplary mobile network environment 100. The number and arrangement of components in FIG. 1 are provided for purposes of illustration and can be adapted, modified, and/or rearranged. As shown in the exemplary embodiment of FIG. 1, an area to be supplied with cellular (radio) service can be divided into shaped cells 110, which can be hexagonal (as shown), square, circular, or have any other suitable shape. Cells 110 can vary in size and can be as small as ¼ mile in diameter and as large as 90 miles in diameter, for example, depending on population density, limitations of the terrain and/or the particular cellular technology being employed, and other factors.

Each cell 110 is registered to (or covered by) a cell tower 104, sometimes referred to as a cell site or a base station. Cell tower 104 can communicate with and manage calls of one or more mobile devices 102 that are located within the boundaries of the cell or are close to the cell. Cell tower 104 can include one or more antennas 114, transmitters, receivers, digital signal processors (DSPs), control electronics, GPS receivers, electrical power sources, and sheltering. Antennas 114 can include directional antennas and omnidirectional antennas. A directional antenna (also referred to as a high-gain or beam antenna) is an antenna that radiates greater power in one or more directions, thus covering a greater range in one or more directions, and a smaller range in other directions. In contrast, an omnidirectional antenna radiates power uniformly in all directions in one plane, thus covering approximately the same range in all directions. Accordingly, cell tower 104 can be located at the center of its corresponding cell 110 if it includes one or more omnidirectional antennas, or it can be located at the corner of its corresponding cell 110, if it includes one or more directional antennas. If cell tower 104 is located at the corner of cell 110, the cell tower can communicate with mobile devices 104 located in more than one cell 110 (e.g., in each of the three adjacent cells 110).

The working range of cell tower 104, that is, the range within which mobile devices 102 can connect to it reliably, can be designed such as to cover at least the area of the cell (or cells) it is supposed to cover. Cell tower 104 can cover some additional area outside of its cell, allowing "handing over" of an ongoing call from one cell tower to another. The handover can be performed when the mobile phone is moving away from one cell tower 104 to another cell tower 104; that is, moving from one cell 110 into another cell 110. Mobile network environment 100 can detect a handover situation, for example, by comparing the signal strength of the mobile device's transmissions at each of the two cell towers, and determining that the signal at one tower is becoming stronger as the signal at the other tower is becoming weaker. The handover can also be required when one cell tower is at or near its capacity for connecting new calls, in which case the call can be transferred to another cell tower, if the mobile device is located in an overlapped area and can reliably communicate with both of the cell towers.

Cell tower 104 can support one or more digital communication standards (e.g., Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN)), Long Term Evolution (LTE), and/or analog communication standards (e.g., Advanced Mobile Phone System (AMPS)). Cell tower 104 can also support one or more different service providers (carriers), such as Verizon Wireless, AT&T Mobility, Sprint Corporation, T-Mobile, and the like. Each service provider can install its own antenna 114 or it can share antenna 114 with one or more other service providers. Each service provider can be identified with a unique System Identification Code (SID).

Mobile device 102 can be a cellular phone, a satellite phone, or any other electronic communication device whose geographic location can be ascertained. Mobile device 102 can communicate with cell towers 104 and/or any other equipment containing antennas, such one or more space satellites. Mobile device 102 can include a Global Positioning System (GPS) module, which enables it to ascertain its geographic location and send information about its geographic location to other devices.

Mobile network environment 100 can include one or more Mobile Switching Centers (MSCs) such as an MSC 106. MSC 106 can be connected to one or more cell towers 104 and includes equipment for controlling the cell towers and for routing calls to and from mobile devices 102 wirelessly connected to those cell towers. It is appreciated that the term "calls" can include voice calls, circuit switched data, text messages (e.g., via SMS) multimedia messages (e.g., via MMS), conference calls, FAX, and other types of communication data. It is further appreciated that the terms "connected to," "wirelessly connected to," "communicating with," and similar terms, can be used interchangeably when referring to the exchange of wireless signals between mobile devices 102 and cell towers 104.

MSC 106 can also be connected to a Public Switched Telephone Network (PSTN) 108, through which it can receive calls from, and send calls to other devices, such as mobile devices 102 (including mobile devices 102 connected to cell towers 104 that are connected to other MSCs (not shown)), landline telephone sets (not shown), or any other devices that can be connected to PSTN 108 either directly or via additional networks, such as the Internet (not shown).

MSC 106 can also communicate with a mobile location register 112. In some embodiments, mobile location register 112 can include one or more local location registers, such as Visitor Location Registers (VLRs) that can be stored at MSCs such as MSC 106, and one or more global location registers, such as Home Location Registers (HLRs) that can be stored remotely, where all the databases can be synchronized periodically. Mobile location register 112 can include one or more location registers, and each location register can store information for one or more service providers.

Mobile location register 112 can store information about one or more mobile devices 102. For example, mobile location register 112 can store, for each mobile device 102, its phone number, its device ID, such as the international mobile subscriber identity (IMSI), the name of its subscriber, a list of subscribed services and features, and the like.

Mobile location register 112 can also receive from MSC 106 observation data for one or more mobile devices, describing the mobile devices' geographical locations at various times. The observation data can include device information identifying the observed mobile device, location information identifying the location at which the mobile device was observed, and time information identifying the time at which it was observed. In some embodiments, observation data can be obtained by MSC 106 for any mobile device 102 connected to any cell tower 104 controlled by and connected to MSC 106. MSC 106 can obtain new observation data any time that the mobile device wirelessly communicates with any of the cell towers. It will be appreciated that observation data for each mobile device 102 can be obtained not only when the mobile device participates in a call, but at any time that the mobile device sends a signal which is received by a cell tower, where the signal identifies the mobile device. Examples of such activity include text messaging and SMS relays, as well as other forms of data transmission or communications.

Location information included in the observation data can include a unique "tower ID" of the cell tower to which the mobile device was connected at the time of the observation. Location information can also include the location (e.g., the latitude-longitude coordinates) of the cell tower. In some embodiments, instead of or in addition to the tower ID and/or tower location, location information can include the approximate location (e.g., in latitude-longitude coordinates) of the mobile device itself, as ascertained or obtained by, for example, the mobile device using its GPS module. The approximate location can be obtained, for example, by using any suitable location-determination technique, such as triangulation.

In addition to storing the most recently received observation data, mobile location register 112 can store past observation data for a mobile device. For example, mobile location register 112 can store all observation data that was obtained for that mobile device in the past hour, day, month, year, or any other predefined period of time.

Mobile location register 112 can communicate and exchange data with a data fusion system 200, either directly (through a wired or wireless connection) or through a network (not shown). The network can be the Internet, an intranet, a local area network, a wide area network, a campus area network, a metropolitan area network, an extranet, a private extranet, any set of two or more coupled devices, or a combination of any of these or other appropriate networks.

Data fusion system 200 can also communicate and exchange data with other location registers 116. Other location registers 116 can store information about other objects whose geographic location can be ascertained, for example, through an integrated or externally attached GPS receiver coupled to a location transmitter, through triangulation techniques, through intelligent collection devices such as license-plate readers or face-recognition cameras, or by using any other suitable devices and/or techniques. Examples of the other objects include automobiles with an integrated GPS unit, an externally attached GPS beacon, and/or a license plate readable by a license-plate reader; an article of clothing, an accessory, or any other object with a GPS beacon integrated or attached thereto; a person whose face can be recognized by a face-recognition camera, and so forth.

Other location registers 116 can store observation data that can include object information identifying the observed object (e.g., a phone number, a license plate, a vehicle identification number (VIN), a person's name, and the like); location information identifying the location at which the object was observed; and time information identifying the time at which the object was observed at that location. The location information can include the location (e.g., the latitude-longitude coordinates) of the observed object, the location of the observing station (e.g., of the license plate reader or of the face-recognition camera), and/or the observing station's unique identifier, based on which the observing station's location can be ascertained.

Figure 2:
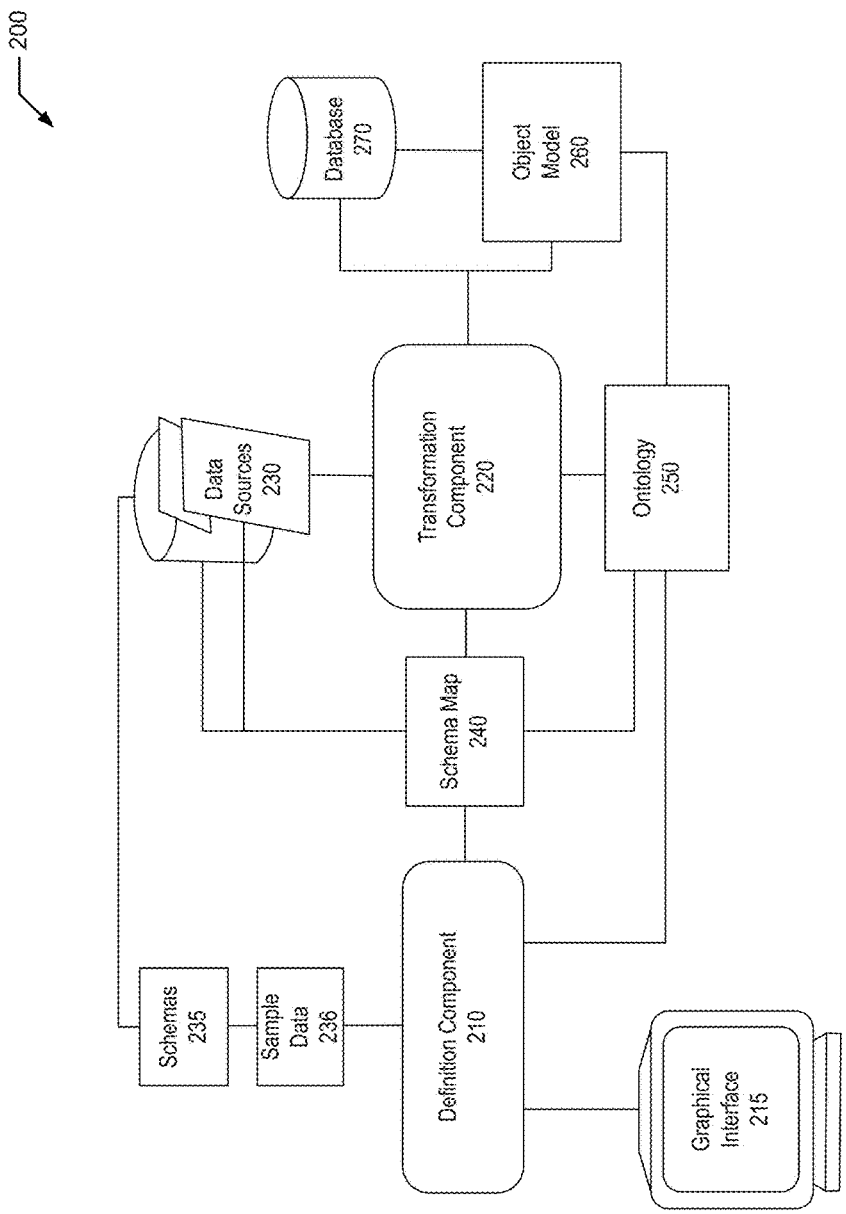
FIG. 2 is a block diagram of an exemplary data fusion system, consistent with embodiments of the present disclosure.

FIG. 2 shows, in block diagram form, an exemplary data fusion system 200, consistent with embodiments of the present disclosure. Among other things, system 200 facilitates transformation of one or more data sources, such as data sources 230, into an object model 260, whose semantics are defined by an ontology 250. The transformation can be performed for a variety of reasons. For example, a database administrator can wish to import data from data sources 230 into a database 270 for persistently storing object model 260. As another example, a data presentation component (not depicted) can transform input data from data sources 230 "on the fly" into object model 260. Object model 260 can then be utilized, in conjunction with ontology 250, for analysis through graphs and/or other data visualization techniques.

System 200 comprises a definition component 210 and a translation component 220, both implemented by one or more processors on one or more computing devices executing hardware and/or software-based logic for providing various functionality described herein. As will be appreciated from the present disclosure, system 200 can comprise fewer or additional components that provide various functionalities described herein. Such components are, for clarity, omitted from FIG. 2. Moreover, the component(s) of system 200 responsible for providing various functionalities can further vary from embodiment to embodiment.

Definition component 210 generates and/or modifies ontology 250 and a schema map 240. Exemplary embodiments for defining an ontology (such as ontology 250) are described in U.S. Pat. No. 7,962,495 (the '495 Patent), issued Jun. 14, 2011, the entire contents of which are expressly incorporated herein by reference. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time. And for each property type, at least one parser definition is created. The attributes of a parser definition can be edited or modified at any time.

In some embodiments, each property type is declared to be representative of one or more object types. A property type is representative of an object type when the property type is intuitively associated with the object type. For example, a property type of "Social Security Number" may be representative of an object type "Person" but not representative of an object type "Business."

In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_ NAME}→Name:Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

Referring to FIG. 2, schema map 240 can define how various elements of schemas 235 for data sources 230 map to various elements of ontology 250. Definition component 210 receives, calculates, extracts, or otherwise identifies schemas 235 for data sources 230. Schemas 235 define the structure of data sources 230—for example, the names and other characteristics of tables, files, columns, fields, properties, and so forth. Definition component 210 furthermore optionally identifies sample data 236 from data sources 230. Definition component 210 can further identify object type, relationship, and property definitions from ontology 250, if any already exist. Definition component 210 can further identify pre-existing mappings from schema map 240, if such mappings exist.

Based on the identified information, definition component 210 can generate a graphical interface 215. Graphical interface 215 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 215 features a visual workspace that visually depicts representations of the elements of ontology 250 for which mappings are defined in schema map 240. Graphical interface 215 also includes controls for adding new elements to schema map 240 and/or ontology 250, including objects, properties of objects, and relationships, via the visual workspace. After elements of ontology 250 are represented in the visual workspace, graphical interface 215 can further provide controls in association with the representations that allow for modifying the elements of ontology 250 and identifying how the elements of ontology 250 correspond to elements of schemas 235. Optionally, the graphical interface 215 can further utilize sample data 236 to provide the user with a preview of object model 260 as the user defines schema map 240. In response to the input via the various controls of graphical interface 215, definition component 210 can generate and/or modify ontology 250 and schema map 240.

In some embodiments, graphical interface 215 can provide an interface providing a user with the ability to add structure to an unstructured document stored in data sources 230 by tagging one or more portions (e.g., text) within the document. Defining tags and applying these tags to a portion of the document can create object, properties, or links creating a relationship between one or more objects and/or properties.

Transformation component 220 can be invoked after schema map 240 and ontology 250 have been defined or redefined. Transformation component 220 identifies schema map 240 and ontology 250. Transformation component 220 further reads data sources 230 and identifies schemas 235 for data sources 230. For each element of ontology 250 described in schema map 240, transformation component 220 iterates through some or all of the data items of data sources 230, generating elements of object model 260 in the manner specified by schema map 240. In some embodiments, transformation component 220 can store a representation of each generated element of object model 260 in a database 270. In some embodiments, transformation component 220 is further configured to synchronize changes in object model 260 back to data sources 230.

Data sources 230 can be one or more sources of data, including, without limitation, spreadsheet files, databases, email folders, document collections, media collections, contact directories, and so forth. Data sources 230 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 230 can include data structures stored persistently in non-volatile memory. Data sources 230 can also or alternatively include temporary data structures generated from underlying data sources via data extraction components, such as a result set returned from a database server executing a database query. Data sources 230 can include or be synchronized with external data sources, such as one or more mobile location registers 112 and/or other location registers 116.

Schema map 240, ontology 250, and schemas 235 can be stored in any suitable data structure(s), such as XML files, database tables, and so forth. In some embodiments, ontology 250 is maintained persistently. Schema map 240 can or cannot be maintained persistently, depending on whether the transformation process is perpetual or a one-time event. Schemas 235 need not be maintained in persistent memory, but can be cached for optimization.

Object model 260 comprises collections of elements such as typed objects, properties, and relationships. The collections can be structured in any suitable manner. In some embodiments, a database 270 stores the elements of object model 260, or representations thereof. In some embodiments, the elements of object model 260 are stored within database 270 in a different underlying format, such as in a series of object, property, and relationship tables in a relational database.

As discussed above, system 200 can receive, from mobile location register 112 or other location registers 116, observation data describing the geographical locations of mobile devices 102 and/or other objects (hereinafter referred collectively as "objects") at various time. Observation data can be described as comprising one or more observation entries, or "observations," each observation corresponding to a particular time and location at which a particular object has been observed.

Observation data can then be stored in data sources 230 and transformed into object model 260, in accordance with the methods described above. The amount of stored observation data can be unlimited or it can be limited to observations that have occurred within the most recent predefined period of time, for example, within the last day, week, month, etc., in which case older observation entries can be removed from system 200 to save memory space.

Figure 3:
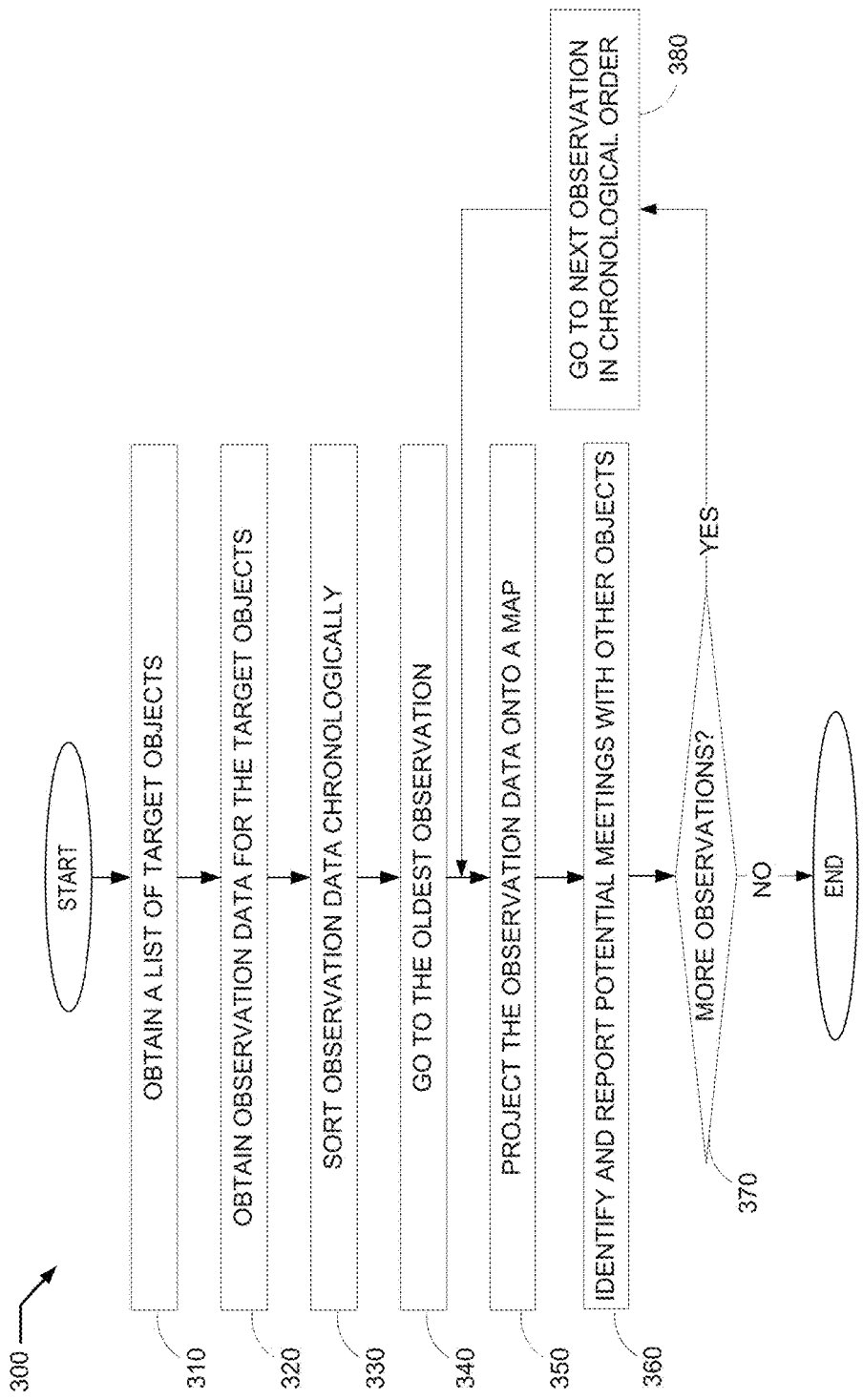
FIG. 3 is a flowchart of an exemplary method for collocation detection, consistent with embodiments of the present disclosure.

Referring now to FIG. 3, a flowchart representing an exemplary method 300 for collocation detection is presented. Method 300 can be performed by one or more electronic devices, such as one or more electronic devices comprising or having access to fusion system 200. While method 300 and the other following embodiments described herein can be performed by multiple electronic devices, for purposes of simplicity and without limitation, these embodiments will be explained with respect to a single electronic device. While the flowchart discloses the following steps in a particular order, it will be appreciated that at least some of the steps can be moved, modified, or deleted where appropriate, consistent with the teachings of the present disclosure.

At step 310, the electronic device receives a list of one or more target objects (e.g., mobile devices 102, a car, a person, or any other object whose geographic location can be ascertained, as discussed above). The list can be received, for example, from a user through graphic interface 215. Each object in the list can be identified by a device ID, a phone number, a license plate number, a person's name, or any other information uniquely identifying the object. In some embodiments, step 310 can be omitted, in which case the electronic device can consider as target objects all objects for which observation data is available.

At step 320, the electronic device obtains (e.g., from data fusion system 200) observation data for the target objects. The electronic device can obtain all observation data available for the target objects, or only observation data whose time information falls within a predefined period of time (e.g., within the last 24 hours).

In some embodiments, after obtaining the observation data, the electronic device can preprocess the observation data. Preprocessing can include removing redundant observations—observations that occurred around the same location and around the same time. For example, if there are two or more observations of the target object at the same location (e.g., the same tower ID) and within the same predefined period of time (e.g., within 5 minutes of each other), the electronic device can remove all but one of these observations, such that the removed observations are not considered in the following steps. The electronic device can also modify the time information of the one remaining observation to reflect the average time of the two or more observations. Removing redundant observations can improve performance and memory requirements of method 300.

At step 330, if the obtained observation data is not stored in a chronological order, the electronic device can sort the observation data in a chronological order, for example, from the oldest observation to the most recent observation, or vice versa.

At step 340, the electronic device begins processing the observation data, observation by observation, starting with the oldest observation among the observations obtained at step 320.

Figure 4:
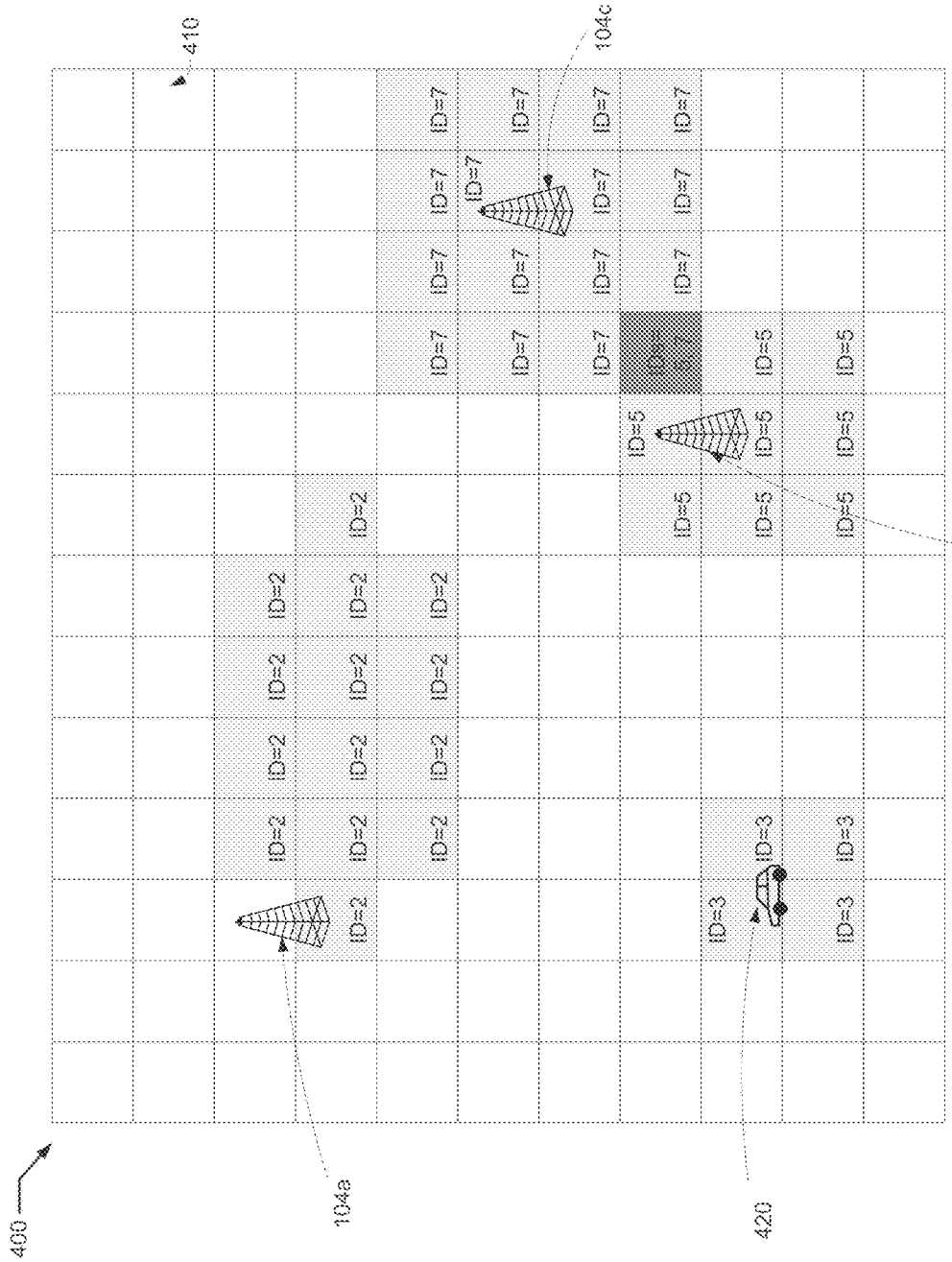
FIG. 4 illustrates an exemplary map, consistent with embodiments of the present disclosure.

At step 350, the electronic device projects the observation on a map. In some embodiments, the map can be represented by any data structure (e.g., an array, a linked list, a search tree, a hash table, or any combination thereof) that represents objects' geographical locations, i.e., the objects' 2D or 3D spatial coordinates. The map can be stored in a volatile memory or in a non-volatile (persistent) memory. To save memory space, the map can store only those locations to which at least one object is being projected. In some embodiments, the map can comprise (or be divided into) a plurality of grid units, each grid unit representing a non-overlapping geographic area of a predefined shape and a predefined size. For example, each grid unit can correspond to a 30 ft×30 ft square geographical area. Other shapes for the grid units include rectangles, triangles, or any other regular or irregular shapes. In some embodiments, all grid units can have the same shape and size, while in other embodiments, grid units can vary by shape and size, depending, for example, on a population density of the corresponding geographical area. FIG. 4 illustrates an exemplary map 400 having square grid units 410, in accordance with some embodiments. Exemplary map 400 is described in more detail below.

Referring back to step 350, the electronic device projects the observation onto the map based on the observation's location information. As discussed above, the location information can include any combination of the following: observed object's location, location of the observing station (e.g., location of the license plate reader or the face-recognition camera), observing station's unique identifier, based on which the observing station's location can be ascertained, and any other types of information indicating the object's approximate location at the time of the observation. In some embodiments, if the location information does not include the location of the object or the location of the observing station, but includes the observing station's unique identifier, the electronic device can retrieve the observing station's location based on the unique identifier by accessing an internal or remote database storing information on one or more observing stations.

Still referring to step 350, in some embodiments, the electronic device determines, based on the observation's location information, an area on the map that corresponds to a geographical area where the observed object was potentially present at the time of the observation. The area can be represented by one or more grid units on the map. Thus, for example, the electronic device can determine, at step 350, one or more grid units based on the observation's location information. Different types of location information can be associated with different accuracy levels. For example, if the location information comprises the latitude/longitude of the observed object (obtained, for example, via a GPS module coupled to the observed object), the accuracy level can be high (e.g., 100-feet accuracy or higher). However, the level of accuracy can be lower when the location information does not comprise the latitude/longitude location of the observed object, and only comprises, for example, the latitude/longitude location or the unique identifier of the observing station.

Accordingly, in some embodiments, the number of grid units determined by the electronic device to correspond to geographical areas where the observed object could have been present at the time of the observation can be in inverse relationship to the accuracy level of the location information. In other words, the number of grid units can be higher when the accuracy is lower, and vice versa. For example, if only the location of the observing station (e.g., cell tower) is known or can be ascertained via its unique identifier, the electronic device can determine that 9 grid units closest to the observing station's location correspond to geographical areas where the observed object could have been present at the time of the observation. However, if the latitude/longitude location of the object itself is known, the electronic device can determine, for example, that only a small number (e.g., 1, 2, 3, or 4) of grid units closest to the latitude/longitude location correspond to geographical areas where the observed object could have been present at the time of the observation.

In some embodiments, if the grid units are determined based on the location of the observing station and not the location of the object, the number of grid units and their positions relative to the location of the observing station can be determined by the electronic device based on one or more parameters of the observing station. The parameters can be obtained, for example, by accessing a database storing information about observing stations. The parameters can include the type of the observing station, the power and orientation (i.e., azimuth and/or directionality) of its antenna(s), it's topographical location, and so forth. The type of observing station can indicate whether the station is a cell tower, a license-plate reader, a face-recognition camera, etc. The type of observing station can further indicate additional characteristics, such as the type of equipment used by the station, the standards and communication protocols employed by it, and the like.

In some embodiments, because powerful observing stations can observe (communicate with or receive signals from) objects that are farther away, the number of determined grid units can be in direct relationship to the power of the observing station; that is, the number can be higher when the power is high and lower when the power is low. Also, if the observing station includes a directional antenna oriented toward a particular direction, the observing station can observe farther objects located in that direction, but only closer objects located in other directions. Accordingly, the number of determined grid units can be higher in a direction toward which the directional antenna is oriented, and lower (or zero) in other directions. In some embodiments, the electronic device can obtain (e.g., from a database) the exact geographic coverage area of the observing station, in which case the number and the location of the grid units can be determined such as to match the geographic coverage area.

To illustrate, exemplary map 400 in FIG. 4 depicts cell towers 104a, 104b, and 104c. In this example, 104a is a cell tower comprising a low-power directional antenna, oriented toward east; 104b is a cell tower comprising a low-power omni-directional antenna; and 104c is a cell tower comprising a high-power omni-directional antenna. Accordingly, in this example, 8 and 9 grid units (indicated in grey) can be determined for each of cell tower 104a and cell tower 104b, respectively, and 16 grid units (indicated in grey) can be determined for cell tower 104c, which may be approximately proportional to the power levels of the antennas. Furthermore, because cell towers 104b and 104c include omni-directional antennas, the grid units determined for these cell towers are located roughly uniformly around the location of the cell tower, approximating the shape of a square or a circle. Furthermore, because cell tower 104a includes a directional antenna oriented eastward, the grid units determined for this cell tower are located mostly to the east of the location of the cell tower, in some embodiments approximating the shape of an ellipse. Map 400 also depicts an object 420 (e.g., a car), for whom only 4 grid units, positioned roughly uniformly around the known latitude/longitude location of object 420, were determined.

Referring back to step 350, in some embodiments, after determining the number and the positions of the grid units corresponding to geographical areas where the observed object could have been present at the time of the observation, electronic device can store, in association with these grid units, the object information and the time information of the observation. That is, the electronic device can update the map to indicate, for each of the determined grid units, which object was potentially present at that location and when it was potentially present. In addition, the electronic device can check the map and determine whether the observed object was previously indicated to be at other grid units (e.g., based on previously processed observations). If so, the electronic device can remove those previous indications from the map. Thus, at each point in time, the map can represent only the last processed observation of a particular object. Each grid unit can indicate one or more objects observed at that grid unit and one or more times at which these objects were observed.

To illustrate, exemplary map 400 in FIG. 4 reflects the following observations: an object (e.g., mobile device 102) having device ID=2 was observed by cell tower 104a; an object (e.g., mobile device 102) having device ID=5 was observed by cell tower 104*b*; an object (e.g., mobile device 102) having device ID=7 was observed by cell tower 104*c*; and object (e.g., a car) having device ID=3 was observed by some other means, for example, by a license-plate reader or by a GPS beacon attached to the car. Because one grid unit (indicated in dark grey) was determined by the electronic device to correspond to geographical area where both device having ID=5 and ID=7 were likely present, that grid unit reflects both of these device IDs. For brevity, timing information associated with each observation is omitted from FIG. 4.

As discussed above, when the electronic device processes a more recent observation of an object, the electronic device will update the map to reflect the new location of the object by removing from the map any old location information associated with this object. In addition, in some embodiments, the electronic device will remove location information for any objects for whom no observation data has been obtained for longer than a predefined period of time (e.g., 1 hour). This is because when the object's location cannot be ascertained for longer than a predefined period of time, it can no longer be assumed to be located at its last location. Such removal of expired location information can be performed by the electronic device periodically, for example, each time the electronic device processes a new observation, and can be performed at step 350, or as a separate step before or after step 350 (not shown).

At step 360, the electronic device identifies potential collocations, referred to as "meetings," between the object associated with the currently processed observation and other objects. In some embodiments, the electronic device does this by identifying overlap(s) between the projected area of the currently processed observation and projected areas of observations of other objects. For example, the electronic device can determine that there was a potential meeting between the objects if there is any overlap between the projected areas for their respective observations. As another example, the electronic device can establish the size of the overlapping area and determine that there was a potential meeting only if the overlapping area is larger than a predefined threshold size.

In some embodiments, the electronic device can identify an overlap by determining whether any of the grid units determined at step 350 is already associated with one or more other objects; that is, whether there were other (e.g., previously processed) observations of other objects at the same grid units. If at least one grid unit indicates that one or more other objects, in addition to the object of the currently processed observation, were observed at the grid unit at one or more other times, the electronic device can establish that the currently processed object potentially "met" with those objects, that is, that there is a good possibility that the individuals associated with the objects (e.g., travelling with the objects) were in the vicinity of each other, which can indicate that they met in person.

In some embodiments, in order to establish that two or more objects potentially "met," the electronic device determines whether at least a predefined number of grid units (e.g., 1, 3, 6) are associated with the those objects.

In some embodiments, in addition to determining that one or more objects were observed at the same grid unit(s), the electronic device further considers the time information of the observations. For example, after establishing a potential meeting between two or more objects, as discussed above, the electronic device can further determine whether the two or more objects were present at the same grid unit(s) for a predefined period of time (e.g., 30 minutes). In some embodiments, the electronic device can store a list of ongoing "meetings," storing for each meeting its location (e.g., unit grid(s)), information about two or more objects participating in the meeting, the starting time at which the two or more objects were first observed at that location, and any other relevant information. The electronic device can update the meeting information any time one of the two or more objects is removed from that location (either because it moved to a different location or because it was not observed for a predefined period of time, as described above), or when a new object joins the meeting. Based on the information for each meeting, the electronic device can determine the starting time of the meeting (e.g., when at least two objects first appeared at that location) and the ending time of the meeting (e.g., the time at which one or more objects were removed from that location causing the location to have less than two objects).

In some embodiments, the electronic device can display information about each of the potential meetings to the user (e.g., via graphical interface 215). In some embodiments, the electronic device can display information only about potential meetings that meet certain predefined criteria. For example, the electronic device can display information only for those meetings that lasted longer than a predefined period of time (e.g., 30 minutes), included more than a predetermined number of participants (objects), occurred at specific hours of the day or days of the week, at a specific geographical region, or any combination of these or other criteria. The potential meeting information can include, for example, identification information of each of the objects, the times at which each object was observed, and the grid units at which each object was observed.

At step 370, the electronic device determines whether there are additional observations to process. If so, the electronic device proceeds, at step 380, to the next observation in chronological order, and then proceeds to step 350 to project that observation on the map, as described above. If there are no more observations, the method ends.

As discussed above, some steps of exemplary method 300 can be omitted, reordered, modified, or added. For example, depending on the data structure storing the obtained observation data, step 320 may be omitted and the observation data may not need to be sorted chronologically, if the data structure allows for a chronological access to an unsorted data. As another example, instead of identifying and reporting potential meetings at step 360 after each observation is projected at step 350, the electronic device can first project all the observations onto the map so that the map reflects all observation data at once, and then apply any suitable algorithm that, based on the projected observation data, determines and reports one or more meetings, each meeting comprising information about two or more objects that were located at the same location, at the same time, and for at least a predefined period of time.

According to some embodiments, the operations, techniques, and/or components described herein can be implemented by the electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
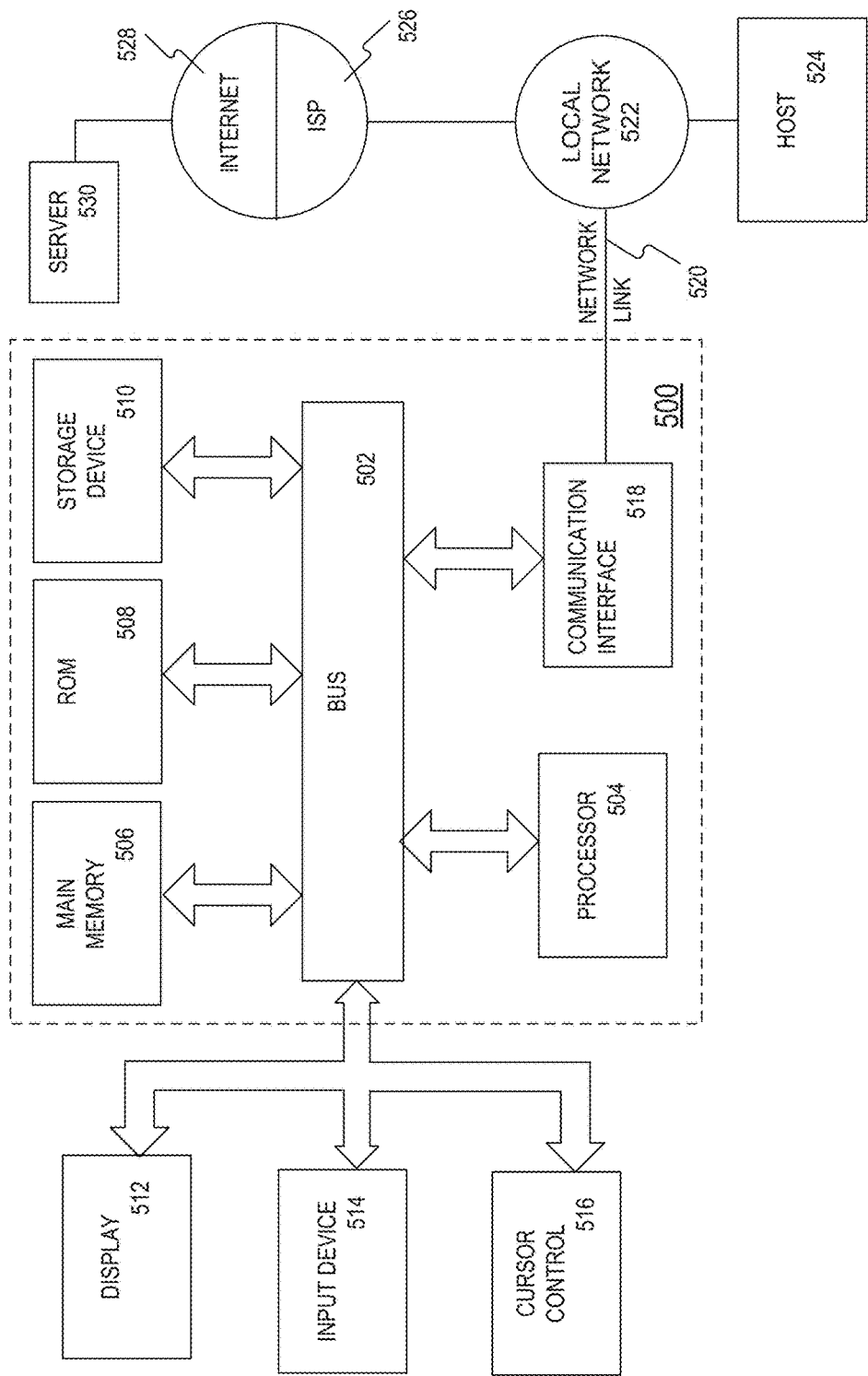
FIG. 5 is a block diagram of an exemplary electronic device with which embodiments of the present disclosure can be implemented.

By way of example, FIG. 5 is a block diagram that illustrates an implementation of electronic device 500, which, as described above, can comprise one or more electronic devices. Electronic device 500 includes a bus 502 or other communication mechanism for communicating information, and one or more hardware processors 504, coupled with bus 502 for processing information. One or more hardware processors 504 can be, for example, one or more general purpose microprocessors.

Electronic device 500 also includes a main memory 506, such as a random access memory (RAM) or other dynamic storage device, coupled to bus 502 for storing information and instructions to be executed by processor 504. Main memory 506 also can be used for storing temporary variables or other intermediate information during execution of instructions to be executed by processor 504. Such instructions, when stored in non-transitory storage media accessible to one or more processors 504, render electronic device 500 into a special-purpose machine that is customized to perform the operations specified in the instructions.

Electronic device 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Electronic device 500 can be coupled via bus 502 to a display 512, such as a cathode ray tube (CRT), an LCD display, or a touchscreen, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 500 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 500 can implement the techniques and other features described herein using customized hard-wired logic, one or more ASICs or FPGAs, firmware and/or program logic which in combination with the electronic device causes or programs electronic device 500 to be a special-purpose machine. According to some embodiments, the techniques and other features described herein are performed by electronic device 500 in response to one or more processors 504 executing one or more sequences of one or more instructions contained in main memory 506. Such instructions can be read into main memory 506 from another storage medium, such as storage device 510. Execution of the sequences of instructions contained in main memory 506 causes processor 504 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media can be involved in carrying one or more sequences of one or more instructions to processor 504 for execution. For example, the instructions can initially be carried on a magnetic disk or solid state drive of a remote computer. The remote computer can load the instructions into its dynamic memory and send the instructions over a telephone line using a modem. A modem local to electronic device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 can optionally be stored on storage device 510 either before or after execution by processor 504.

Electronic device 500 also includes a communication interface 518 coupled to bus 502. Communication interface 518 provides a two-way data communication coupling to a network link 520 that is connected to a local network 522. For example, communication interface 518 can be an integrated services digital network (ISDN) card, cable modem, satellite modem, or a modem to provide a data communication connection to a corresponding type of telephone line. As another example, communication interface 518 can be a local area network (LAN) card to provide a data communication connection to a compatible LAN. Wireless links can also be implemented. In any such implementation, communication interface 518 sends and receives electrical, electromagnetic or optical signals that carry digital data streams representing various types of information.

Network link 520 typically provides data communication through one or more networks to other data devices. For example, network link 520 can provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from electronic device 500, are example forms of transmission media.

Electronic device 500 can send messages and receive data, including program code, through the network(s), network link 520 and communication interface 518. In the Internet example, a server 530 might transmit a requested code for an application program through Internet 528, ISP 526, local network 522 and communication interface 518. The received code can be executed by processor 504 as it is received, and/or stored in storage device 510, or other non-volatile storage for later execution.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the exemplary methods or processes disclosed herein.

What is claimed is:

1. An electronic device comprising:
   one or more non-transitory computer-readable storage media that store instructions; and
   one or more processors that execute the instructions to:
      obtain a first object observation comprising a first object identifier, a first observation time, and a first observation location;
      obtain a second object observation comprising a second object identifier, a second observation time, and a second observation location;
      identify a first observing station at the first observation location and associated with the first object observation;
      obtain a parameter indicating a first observing station type of the first observing station;
      determine a first geographic area based at least in part on the first observing station type and first observation location, wherein a size of the first geographic area reflects a level of coverage of the first observing station type;
      associate the first observation with the first geographic area; and
      associate the second observation with a second geographic area.

2. The electronic device of claim 1, wherein the one or more processors further execute the instructions to determine whether a potential meeting occurred between objects associated with the first object identifier and the second object identifier based on the first and second observation times, and the first and second geographic areas.

3. The electronic device of claim 2, wherein the determination of whether a potential meeting occurred comprises determining whether there is an overlap between the first geographic area and the second geographic area.

4. The electronic device of claim 3, wherein the first observation is associated with a cell tower, and the size of the first geographic area reflects the cell tower's power.

5. The electronic device of claim 3, wherein the first observation is associated with a cell tower having an antenna, and the first geographic area reflects the antenna's orientation.

6. The electronic device of claim 1, wherein the one or more processors further execute the instructions to:
   obtain a third object observation comprising a third object identifier, a third observation time, and a third observation location;

associate the third observation with a third geographic area; and determine whether a potential meeting occurred between objects associated with the first object identifier, the second object identifier, and the third object identifier based on the first, second, and third observation times, and the first, second, and third geographic areas.

7. The electronic device of claim 2, wherein:
the first geographic area is a first area on a map;
the second geographic area is a second area on the map;
the map is divided into a plurality of grid units;
the association of the first observation with a first geographic area comprises determining one or more first grid units that correspond to the first geographic area; and
the association of the second observation with a second geographic area comprises determining one or more second grid units that correspond to the second geographic area.

8. The electronic device of claim 7, wherein the determination of whether the potential meeting occurred comprises determining whether a number of first grid units matching the second grid units exceeds a predefined threshold number.

9. The electronic device of claim 8, wherein the determination of whether the potential meeting occurred further comprises determining, based at least on the first and second observation times, whether the objects associated with the first and second object identifiers were located at the first and second geographic areas, respectively, for a period of time that is longer than a predefined threshold period of time.

10. A method performed by at least one electronic device comprising one or more processors, the method comprising:
obtaining a first object observation comprising a first object identifier, a first observation time, and a first observation location;
obtaining a second object observation comprising a second object identifier, a second observation time, and a second observation location;
identifying a first observing station at the first observation location and associated with the first object observation;
obtain a parameter indicating a first observing station type of the first observing station;
determining a first geographic area based at least in part on the first observing station type and first observation location, wherein a size of the first geographic area reflects a level of coverage of the first observing station type;
associating the first observation with the first geographic area; and
associating the second observation with a second geographic area.

11. The method of claim 10, further comprising determining whether a potential meeting occurred between objects associated with the first object identifier and the second object identifier based on the first and second observation times, and the first and second geographic areas.

12. The method of claim 11, wherein determining whether a potential meeting occurred comprises determining whether there is an overlap between the first geographic area and the second geographic area.

13. The electronic device of claim 1, wherein the one or more processors further execute the instructions to:
determine one or more characteristics of the first observing station; and determine the first geographic area based at least in part on the first observing station type, first observation location, and the one or more characteristics.

14. The electronic device of claim 1, wherein the first geographic area is a first area on a map and the second geographic area is a second area on the map.

15. The method of claim 10, further comprising:
obtaining a third object observation comprising a third object identifier, a third observation time, and a third observation location;
associating the third observation with a third geographic area; and
determining whether a potential meeting occurred between objects associated with the first object identifier, the second object identifier, and the third object identifier based on the first, second, and third observation times, and the first, second, and third geographic areas.

16. The method of claim 11, wherein:
the first geographic area is a first area on a map;
the second geographic area is a second area on the map;
the map is divided into a plurality of grid units;
associating the first observation with a first geographic area comprises determining one or more first grid units that correspond to the first geographic area; and
associating the second observation with a second geographic area comprises determining one or more second grid units that correspond to the second geographic area.

17. The method of claim 16, wherein determining whether the potential meeting occurred comprises determining whether a number of first grid units matching the second grid units exceeds a predefined threshold number.

18. The method of claim 17, wherein determining whether the potential meeting occurred further comprises determining, based at least on the first and second observation times, whether the objects associated with the first and second object identifiers were located at the first and second geographic areas, respectively, for a period of time that is longer than a predefined threshold period of time.

19. A non-transitory computer-readable medium storing a set of instructions that are executable by one or more electronic devices, each having one or more processors, to cause the one or more electronic devices to perform a method, the method comprising:
obtaining a first object observation comprising a first object identifier, a first observation time, and a first observation location;
obtaining a second object observation comprising a second object identifier, a second observation time, and a second observation location;
identifying a first observing station at the first observation location and associated with the first object observation;
obtain a parameter indicating a first observing station type of the first observing station;
determining a first geographic area based at least in part on the first observing station type and first observation location, wherein a size of the first geographic area reflects a level of coverage of the first observing station type;
associating the first observation with the first geographic area; and
associating the second observation with a second geographic area.

20. The non-transitory computer-readable medium of claim 19, wherein the method further comprises determining whether a potential meeting occurred between objects associated with the first object identifier and the second object identifier based on the first and second observation times, and the first and second geographic areas.

* * * * *